(12) United States Patent
Liu et al.

(10) Patent No.: US 11,684,953 B2
(45) Date of Patent: Jun. 27, 2023

(54) DEVICE AND METHOD FOR OFF-LINE DETECTION OF CIRCUMFERENTIAL APPEARANCE QUALITY OF CIGARETTES

(71) Applicant: CHINA TOBACCO YUNNAN INDUSTRIAL CO., LTD, Kunming (CN)

(72) Inventors: Ze Liu, Kunming (CN); Banghua He, Kunming (CN); Yuanzhen Zhou, Kunming (CN); Zhenjie Li, Kunming (CN); Changgui Qiu, Kunming (CN); Ji Yang, Kunming (CN); Jin Chen, Kunming (CN); Yunyue Cui, Kunming (CN); Qian Sun, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/776,600

(22) PCT Filed: Oct. 21, 2020

(86) PCT No.: PCT/CN2020/122509
§ 371 (c)(1),
(2) Date: May 13, 2022

(87) PCT Pub. No.: WO2022/082509
PCT Pub. Date: Apr. 28, 2022

(65) Prior Publication Data
US 2022/0388036 A1    Dec. 8, 2022

(30) Foreign Application Priority Data
Oct. 20, 2020 (CN) .......................... 202011127394.9

(51) Int. Cl.
*B07C 5/02* (2006.01)
*A24C 5/34* (2006.01)
(Continued)

(52) U.S. Cl.
CPC ................ *B07C 5/02* (2013.01); *A24C 5/345* (2013.01); *A24C 5/3412* (2013.01); *B07C 5/10* (2013.01); *B07C 5/362* (2013.01); *B07C 5/38* (2013.01)

(58) Field of Classification Search
CPC .. B07C 5/02; B07C 5/10; B07C 5/362; B07C 5/38; A24C 5/3412; A24C 5/345
(Continued)

(56) References Cited

U.S. PATENT DOCUMENTS 2,601,920 A * 7/1952 Salfisberg ................. B07C 5/02
                                                                74/77
4,277,678 A * 7/1981 Wahle .................. A24C 5/3412
                                                                209/535
(Continued)

FOREIGN PATENT DOCUMENTS

| CN | 101143026 A | 3/2008 |
| CN | 105410989 A | 3/2016 |

(Continued)

OTHER PUBLICATIONS

GB/T 22838.12-2009, Determination of physical characteristics for cigarettes and filter rods—Part 12: Cigarettes appearance, Standards Press of China, 2009, pp. 1-2.

*Primary Examiner* — Joseph C Rodriguez
(74) *Attorney, Agent, or Firm* — Bayramoglu Law Offices LLC

(57) ABSTRACT

A device for off-line detection of circumferential appearance quality of cigarettes includes a mechanical system, a vision system and a control system, where the mechanical system
(Continued)

includes a hopper, a feed roller, an auto-rotating roller, an upper chute and a lower chute. A method for off-line detection of circumferential appearance quality of cigarettes by using the above device is further provided. The present disclosure can achieve detection without omission to obtain accurate and quantifiable detection results, and has high processing efficiency.

14 Claims, 2 Drawing Sheets

(51) Int. Cl.
    *A24C 5/345*     (2006.01)
    *B07C 5/10*     (2006.01)
    *B07C 5/36*     (2006.01)
    *B07C 5/38*     (2006.01)

(58) Field of Classification Search
    USPC .................................................. 209/535, 536
    See application file for complete search history.

(56) References Cited

U.S. PATENT DOCUMENTS

| | | | |
|---|---|---|---|
| 5,228,462 A | 7/1993 | Osmalov et al. | |
| 5,695,070 A * | 12/1997 | Draghetti | A24C 5/34 |
| | | | 209/919 |
| 6,169,600 B1 | 1/2001 | Ludlow | |
| 6,314,876 B1 * | 11/2001 | Ackley | A61J 3/007 |
| | | | 198/803.14 |
| 6,394,097 B1 * | 5/2002 | Okumoto | A24C 5/3412 |
| | | | 131/281 |
| 7,059,478 B2 * | 6/2006 | Spatafora | B65B 19/30 |
| | | | 209/535 |
| 9,757,772 B2 * | 9/2017 | Ackley | B07C 5/3422 |

FOREIGN PATENT DOCUMENTS

| | | | | |
|---|---|---|---|---|
| CN | 105928950 A | 9/2016 | | |
| CN | 107080285 A | 8/2017 | | |
| CN | 207185897 U | 4/2018 | | |
| CN | 110907309 A | 3/2020 | | |
| CN | 111000286 A | 4/2020 | | |
| EP | 3563696 A2 * | 11/2019 | ............. | A24C 5/327 |
| WO | WO-2015135610 A1 * | 9/2015 | ................ | A24C 5/12 |

\* cited by examiner

DEVICE AND METHOD FOR OFF-LINE DETECTION OF CIRCUMFERENTIAL APPEARANCE QUALITY OF CIGARETTES

CROSS REFERENCE TO THE RELATED APPLICATIONS

This application is the national phase entry of International Application No. PCT/CN2020/122509, filed on Oct. 21, 2020, which is based upon and claims priority to Chinese Patent Application No. 202011127394.9, filed on Oct. 20, 2020, the entire contents of which are incorporated herein by reference.

TECHNICAL FIELD

The present disclosure relates to the technical field of cigarette quality detection, and in particular to a device and method for off-line detection of circumferential appearance quality of cigarettes.

BACKGROUND

The appearance quality of cigarettes refers to the appearance quality of the cigarette paper part. The unqualified appearance quality of cigarettes is mainly manifested in yellow stains, punctures, wrinkles and clipping, etc., including oil stains on the cigarette paper and other speckle defects that are different from the color of the cigarette paper and larger than the size specified by the Chinese national standard of cigarettes. The statistics in recent years shows that, among the consumer complaints about the appearance quality defects of cigarettes including yellow stains, punctures, wrinkles and clipping, those regarding yellow stains account for about 30%.

In actual production, the probability of finished cigarettes to have appearance quality defects such as yellow stains increases significantly after 48 hours of storage, and yellow stains occur frequently in dry seasons with less humidity, such as winter. Due to changes in the temperature and humidity of the storage environment and changes in the driving force for mass transfer of the cut lamina component to the cigarette paper, the finished cut tobacco, oil, feed liquid, moisture, or other components in contact with the cigarette paper overflow, resulting in the occurrence of yellow stains. In other words, yellow stains appear mainly due to changes of parameters in the storage process of finished cigarettes and improper settings of parameters in the cigarette rolling process. Of course, yellow stains vary in different consumption areas. In general, yellow stains are the result of changes in the driving force for mass transfer and the total mass transfer of the finished cut tobacco component to the cigarette paper.

In China, the current off-line detection on the appearance quality defects of cigarettes is carried out in accordance with the national standard GB/T222838.12-2009 *"Determination of physical characteristics for cigarettes and filter rods—Part 12: Cigarettes appearance"*. The appearance quality defects of cigarettes are qualitatively determined by manual visual detection, which has the problems of long detection time, large errors, and missed and false detection. A quality inspector having been in the industry for more than 5 years will take an average of 5 minutes to detect 20 cigarettes (that is, a pack of cigarettes) according to the standard. The current production capacity of a high-speed cigarette machine is above 10,000 cigarettes per minute, and the capacity of a packaging machine is above 700 packs per minute. Under the current actual conditions of rolling and packaging, the efficiency of off-line appearance quality detection is seriously lagging behind, which is not conducive to timely feedback of rolling quality for accurate maintenance. More seriously, the manual visual detection method fails to fully extract basic data such as yellow stain size and puncture size to quantitatively analyze the appearance quality of cigarettes.

The existing off-line quality detection methods for cigarettes roughly fall into the following categories. 1. Manual sampling detection. This method avoids the need to set up a device and avoids energy consumption, but it is inefficient, and the worker is prone to visual fatigue, making him/her insensitive to small color differences and unable to quantify defect indicators. 2. Manual feeding and microwave detection. This method features a compact device, simple layout and maintenance-free design. However, the microwaves are only sensitive to changes in density, not color, and the intermittent feeding of single cigarette is inefficient. 3. Manual feeding and visual detection. This method also features a compact device, simple layout and maintenance-free design, but the intermittent feeding of a single cigarette is inefficient.

In these off-line quality detection methods for cigarettes, the quantitative analysis of potential influencing factors of cigarette appearance quality defects is restricted. Nowadays, the application of new technologies, especially visual technology, in product appearance quality detection has become increasingly extensive. It is an indisputable fact that visual detection replaces manual detection to stabilize and improve product quality. However, the on-line visual detection system is restricted by the production efficiency. Due to the fast production speed of cigarettes, it is not possible to perform quality detection on the entire circumference of the cigarettes, but only for parts of the cigarettes. In addition, one visual detection system can only detect one part, and arranging multiple visual detection systems will require a large investment in the production line. Therefore, most of the existing manufacturers opt for statistical sampling to manually detect the appearance of cigarettes. However, manual detection is greatly affected by subjective factors, which may cause misjudgment due to unstable detection standards.

In order to solve the problems of the existing detection methods, it is urgent to provide a device and method for off-line detection of appearance quality of cigarettes to achieve quantitative and rapid detection of quality defects.

SUMMARY

The present disclosure provides a device for off-line detection of circumferential appearance quality of cigarettes. The device is provided in an independent mechanical support box, which makes the device convenient to move, and it can achieve efficient and accurate off-line appearance quality detection of cigarettes of various diameters.

The present disclosure adopts the following technical solutions:

A first aspect of the present disclosure provides a device for off-line detection of circumferential appearance quality of cigarettes. The device includes a mechanical system, where the mechanical system includes a hopper 14, a feed roller 12, an auto-rotating roller 3, an upper chute 11 and a lower chute 4; the feed roller 12 is provided at a lower right side of the hopper 14; the upper chute 11 is provided between the feed roller 12 and the auto-rotating roller 3; the lower chute 4 is provided downstream of the auto-rotating roller 3; multiple distribution flaps 10 are provided at an end of the lower chute 4; a surface of the feed roller 12 is axially evenly provided with multiple second circular slots 121; and a surface of the auto-rotating roller 3 is axially evenly provided with multiple first circular slots 31.

Preferably, the mechanical system may further include a reversing roller 13; the reversing roller 13 may be provided with a rough outer surface; the reversing roller 13 may be provided between the feed roller 12 and the hopper 14 and on an upper right outer side of the feed roller 12; and the feed roller 12 and the reversing roller 13 rotate clockwise.

Preferably, an arc length between every two adjacent ones of the first circular slots 31 may be not less than a circumference of a 360° circumferential surface of each of cigarettes Y to be detected to ensure that the circumferential surface of each of the cigarettes Y to be detected rotates at least once; and the first circular slots 31 may be matched with the second circular slots 121 in terms of diameter and quantity.

Preferably, a friction roller 32 may be provided at a right side of the auto-rotating roller 3, and an upper V-shaped space may be formed between the auto-rotating roller 3 and the friction roller 32; the auto-rotating roller 3 and the friction roller 32 each may be provided with a matte rough surface, and the auto-rotating roller 3 and the friction roller 32 rotate counterclockwise; and an end of the upper chute 11 may be provided on the surface of the friction roller 3. The surface of each of the auto-rotating roller 3 and the friction roller 32 is sandblasted and oxidized to a matte black finish to increase a friction force to drive the cigarettes to rotate clockwise at an even speed, and to prevent the surface of each of the auto-rotating roller 3 and the friction roller 32 from reflecting light to avoid affecting the photographing quality of a camera 1. The auto-rotating roller 3 and the friction roller 32 generally have a diameter of 80 mm. The arc length between every two adjacent ones of the first circular slots 31 is generally 115 mm, which ensures that the 360° circumferential surface of the cigarettes Y to be detected rotates at least once. Meanwhile, the feed roller 12 has a rotation speed consistent with that of the auto-rotating roller 3 and the friction roller 32, which ensures that there is only a single cigarette rotating for photographing within a period of time.

Preferably, cigarette Y receiving boxes may be provided under each of the multiple distribution flaps 10.

Preferably, the device may further include a vision system and a control system; the vision system may include a camera 1 and a light source 2; the camera 1 may be provided above the V-shaped space between the auto-rotating roller 3 and the friction roller 32; the light source 2 may be provided surrounding the camera 1; the control system includes a controller 15 for controlling the mechanical system and the vision system; the mechanical system, the vision system and the control system may be arranged in a mechanical support box 17; and a switch 16 may be provided on an outer wall of the mechanical support box.

Preferably, a surface of the reversing roller 13 may be provided with protrusions 131, which may be axially evenly spaced less than 2 mm apart. The current slimmest cigarettes have a diameter of greater than 2 mm. The reversing roller 13 rotates clockwise, and the axially evenly spaced-apart protrusions 131 on the surface of the reversing roller 13 play a rubbing role. They loosen the cigarettes and prevent the cigarettes from being squeezed and jammed to make the cigarettes fed evenly for detection.

Preferably, the feed roller 12 may be axially divided into multiple sections, including spaced-apart fixed roller 12A sections and spaced-apart rotatable roller 12B sections; rotatable rollers 12B may rotate along a central axis of the feed roller 12; the second circular slots 121 on fixed rollers 12A may be fixed circular slots 121A with a diameter of not less than 7.8 mm; the second circular slots 121 on the rotatable rollers 12B may be multi-diameter circular slots 121B; and the circular slots of each diameter may have a same quantity as the fixed circular slots 121A.

Preferably, there may be two fixed roller 12A sections and two rotatable roller 12B sections; and the multi-diameter circular slots 121B may involve three diameters, which may be slightly larger than 7.8 mm, 6.4 mm and 5.5 mm, respectively.

A second aspect of the present disclosure provides a method for off-line detection of circumferential appearance quality of cigarettes, using the above-mentioned device, and including the following steps:

rotating the rotatable roller 12B sections based on a diameter of cigarettes Y to be detected, and matching the multi-diameter circular slots 121B with the fixed circular slots 121A on a diameter basis to form the second circular slots 121 on the surface of the feed roller 12; putting a certain number of cigarettes Y to be detected into the hopper 14; activating the mechanical system, the vision system and the control system by the switch 16; allowing the cigarettes Y in the hopper 14 to enter into the second circular slots 121 of the clockwise-rotating feed roller 12 singly and orderly under the action of the clockwise-rotating reversing roller 13; conveying the cigarettes Y into the V-shaped space between the auto-rotating roller 3 and the friction roller 32 by the upper chute 11; allowing the 360° circumferential surface of each of the cigarettes Y to rotate at least once by the auto-rotating roller 3 and the friction roller 32 that rotate counterclockwise; photographing each of the cigarettes Y by the camera 1 above during rotation; allowing the photographed cigarettes Y to enter into the first circular slots 31 of the auto-rotating roller 3 that rotates counterclockwise, and to be conveyed by the lower chute 4 to the multiple distribution flaps 10 at the end of the lower chute 4; meanwhile, transmitting an image acquired by the camera 1 to the controller 15 for processing; and controlling different distribution flaps 10 to turn over based on a processing result, such that different types of cigarettes fall into different cigarette receiving boxes, thereby achieving sorting of qualified and unqualified cigarettes and sorting of different types of unqualified cigarettes.

The present disclosure has the following beneficial effects:

1. In the present disclosure, the cigarettes roll by gravity, which avoids mechanical damage to the cigarettes. The circular slots on the feed roller and the auto-rotating roller are evenly arranged, and they automatically pick and place single cigarettes. The feed roller and the auto-rotating roller are connected, and the upper chute and the lower chute are connected. The V-shaped space between the auto-rotating roller 3 and the friction roller 32 gently supports the rotating cigarette, such that the camera of the vision system above performs 360° detection of the entire circumference of the cigarette paper.

2. The present disclosure achieves the continuous, short-term, and evenly spaced conveyance and detection of single cigarettes, and achieves 360° detection of the circumferential surface of each of the cigarettes, that is, the cigarette paper part. The present disclosure achieves the classification, rejection and collection of unqualified cigarettes (yellow-stained, punctured, wrinkled and clipped cigarettes), and can perform manual sampling and review on different types of unqualified cigarettes. The present disclosure can derive quantitative statistical data of defective cigarettes, and provide classified statistical data for cigarette defect analysis. The present disclosure can achieve detection without omission to obtain accurate and quantifiable detection results, and has high processing efficiency.

3. In the present disclosure, the circular slots of the feed roller meet the feeding and detection requirements of cigarettes with different diameters. If the diameter of the circular slots of the feed roller is larger than the diameter of the cigarettes to be detected, the cigarettes will slip, making it difficult to convey the cigarettes. If the diameter of the circular slots is smaller than the diameter of the cigarettes to be detected, it is not possible to convey the cigarettes. Therefore, the diameter of the circular slots of the feed roller must be the same as the diameter of the cigarettes. However, this requires frequent replacement of the feed roller. In the present disclosure, the feed roller 12 is axially divided into multiple sections, including the spaced-apart fixed roller 12A sections and the spaced-apart rotatable roller 12B sections. The rotatable rollers 12B rotate along the central axis of the feed roller 12. The surface of each of the rotatable roller 12B sections is axially evenly provided with multi-diameter circular slots 121B. The multi-diameter circular slots 121B are matched with the diameter of the fixed circular slots 121A so as to form the second circular slots 121 on the surface of the feed roller 12 as required. In this way, the feed roller meets the feeding and detection requirements of different diameters of cigarettes. Therefore, the present disclosure saves the trouble of replacing the feed roller 12 with the second circular slots 121 of different diameters to detect cigarettes of different diameters.

4. In the present disclosure, the reversing roller 13 is provided on the upper right outer side of the feed roller 12. The rough outer surface of the reversing roller 13 is generally provided with protrusions 131, which are axially evenly spaced, for example, less than 2 mm apart, much smaller than the diameter of the slimmest cigarettes to be detected. There are currently three common cigarettes, namely normal cigarettes with a diameter of about 7.8 mm, medium cigarettes with a diameter of about 6.4 mm, and slim cigarettes with a diameter of about 5.5 mm. The feed roller 12 and the reversing roller 13 rotate clockwise. The reversing roller 13 rotates clockwise to loosen the cigarettes and prevent the cigarettes from being squeezed and jammed, ensuring that the cigarettes to be detected enter into the second circular slots 121 of the feed roller 12 smoothly and evenly.

5. The device of the present disclosure is stable, reliable, compact, and movable.

Figure 1:
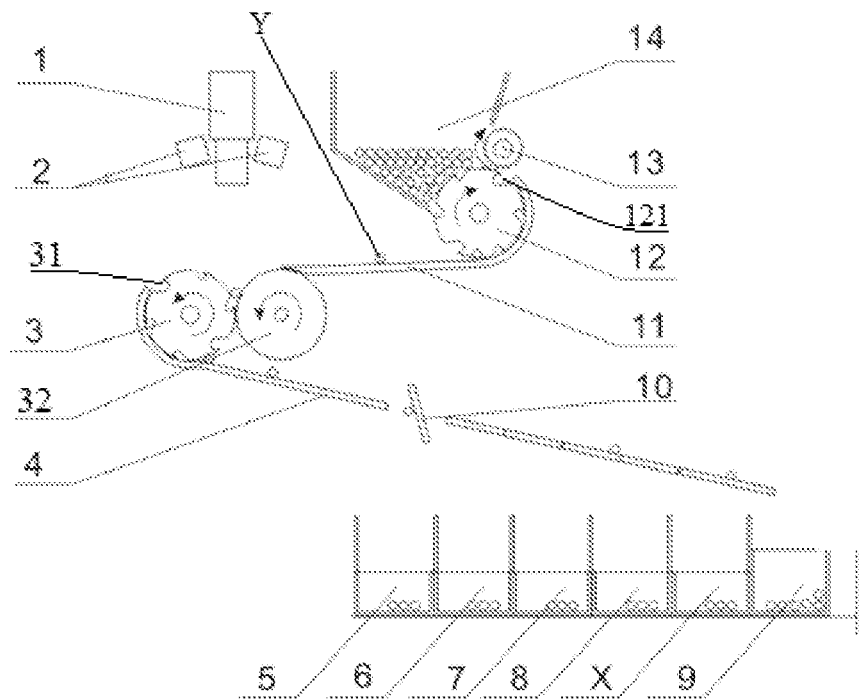
FIG. 1 is a plan view of a device for off-line detection of circumferential appearance quality of cigarettes according to the present disclosure.

Reference Numerals: 1. camera; 2. light source; 3. auto-rotating roller; 31. first circular slot; 32. friction roller; 4. lower chute; 5. yellow-stained cigarette receiving box; 6. punctured cigarette receiving box; 7. wrinkled cigarette receiving box; 8. clipped cigarette receiving box; 9. qualified cigarette receiving box; X. multi-defective cigarette receiving box; 10. distribution flap (6 in quantity); 11. upper chute; 12. feed roller; 12A. fixed roller; 12B. rotatable roller; 121. second circular slot; 121A. fixed circular slot; 121B. multi-diameter circular slot; 13. reversing roller; 131. protrusion; 14. hopper; 15. controller; 16. switch; 17. mechanical support box; and Y. cigarette.

DETAILED DESCRIPTION OF THE EMBODIMENTS

The technical solutions of the present disclosure are described clearly and completely below with reference to the drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

FIG. 1 is a front view of a device for off-line detection of circumferential appearance quality of cigarettes according to the present disclosure. The device includes a mechanical system, a vision system and a control system. The mechanical system includes a hopper 14, a feed roller 12, an auto-rotating roller 3, an upper chute 11 and a lower chute 4. The feed roller 12 is provided at a lower right side of the hopper 14. The upper chute 11 is provided between the feed roller 12 and the auto-rotating roller 3. The lower chute 4 is provided downstream of the auto-rotating roller 3. Multiple distribution flaps 10 are provided at an end of the lower chute 4. The feed roller 12 is axially provided with multiple second circular slots 121. The auto-rotating roller 3 is axially provided with multiple first circular slots 31. The mechanical system further includes a reversing roller 13. The reversing roller 13 is provided with a soft rough outer surface, which is generally provided with protrusions 131. The protrusions are axially evenly spaced less than 2 mm apart. The reversing roller 13 is provided between the feed roller 12 and the hopper 14 and on an upper right outer side of the feed roller 12. The multiple second circular slots 121 are evenly arranged on a surface of the feed roller 12. The multiple first circular slots 31 are evenly arranged on a surface of the auto-rotating roller 3. The second circular slots 121 are matched with the first circular slots 31 in terms of diameter and quantity. The diameter and quantity of the second circular slots 121 and the first circular slots 31 are matched according to a diameter of cigarettes to be detected. The second circular slots 121 and the first circular slots 31 each accommodate only one cigarette, which ensures that the cigarettes are fed and conveyed singly and orderly. The second circular slots 121 and the first circular slots 31 can meet the requirements of different diameters of cigarettes. An arc length between every two adjacent ones of the first circular slots 31 is not less than a circumference of a 360° circumferential surface of each of the cigarettes Y to be detected to ensure that the circumferential surface of the cigarettes Y to be detected rotates at least once. A friction roller 32 is provided at a right side of the auto-rotating roller 3, and an upper V-shaped space is formed between the auto-rotating roller 3 and the friction roller 32. The auto-rotating roller 3 and the friction roller 32 each are provided with a matte rough surface, and the auto-rotating roller 3 and the friction roller 32 rotate counterclockwise. An end of the upper chute 11 is provided on the surface of the friction roller 32. The surface of each of the auto-rotating roller 3 and the friction roller 32 is sandblasted and oxidized to a matte black finish to increase a friction force to drive the cigarettes to rotate clockwise at an even speed. It can also prevent the surface of each of the auto-rotating roller 3 and the friction roller 32 from reflecting light to avoid affecting the photographing quality of a camera 1. The auto-rotating roller 3 and the friction roller 32 generally have a diameter of 80 mm. The arc length between every two adjacent ones of the first circular slots 31 is 115 mm, which ensures that the 360° circumferential surface of the cigarettes Y to be detected rotates at least once. An end of the upper chute 11 is provided on the surface of the friction roller 32. The cigarettes Y enter the V-shaped space between the auto-rotating roller 3 and the friction roller 32 through the upper chute 11, and the cigarettes Y are in tangential contact with the surface of the auto-rotating roller 3. The feed roller 12 has a rotation speed consistent with that of the auto-rotating roller 3 and the friction roller 32, which ensures that there is only a single cigarette rotating in the V-shaped space for photographing within a period of time. Cigarette Y receiving boxes are provided under each of the multiple distribution flaps 10 for collecting qualified and different types of unqualified cigarettes. The quantities of the distribution flaps and the cigarette receiving boxes are set as required. In this embodiment, there are six distribution flaps 10. Correspondingly, there are six cigarette Y receiving boxes, namely a yellow-stained cigarette receiving box 5, a punctured cigarette receiving box 6, a wrinkled cigarette receiving box 7, a clipped cigarette receiving box 8, a qualified cigarette receiving box 9 and a multi-defective cigarette receiving box X. The yellow-stained cigarette receiving box 5, the punctured cigarette receiving box 6, the wrinkled cigarette receiving box 7, the clipped cigarette receiving box 8 and the multi-defective cigarette receiving box X are unqualified cigarette receiving boxes.

Figure 3:
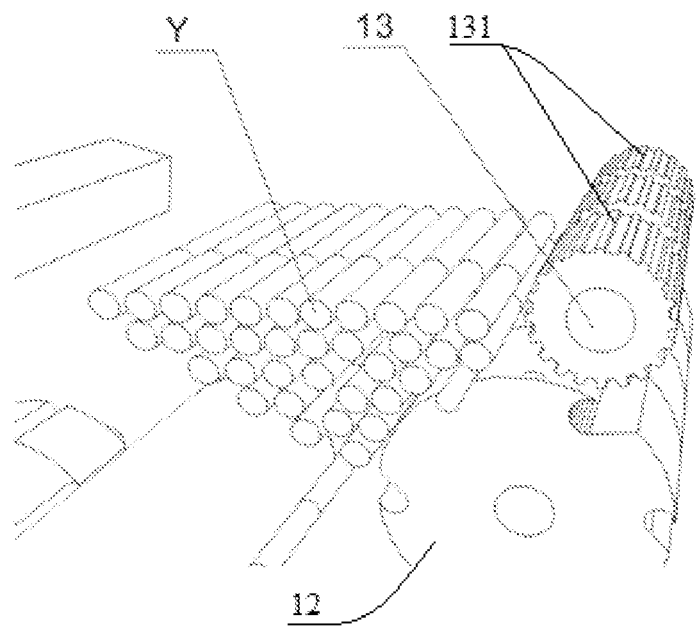
FIG. 3 is a schematic view showing a positional relationship and appearance of a reversing roller and a feed roller according to the present disclosure.

As shown in FIG. 3, the feed roller 12 and the reversing roller 13 rotate clockwise. The reversing roller 13 rotates clockwise to loosen the cigarettes in the hopper 14 and prevent the cigarettes from being squeezed and jammed, ensuring that the cigarettes Y enter into the second circular slots 121 of the feed roller 12 smoothly.

Figure 2:
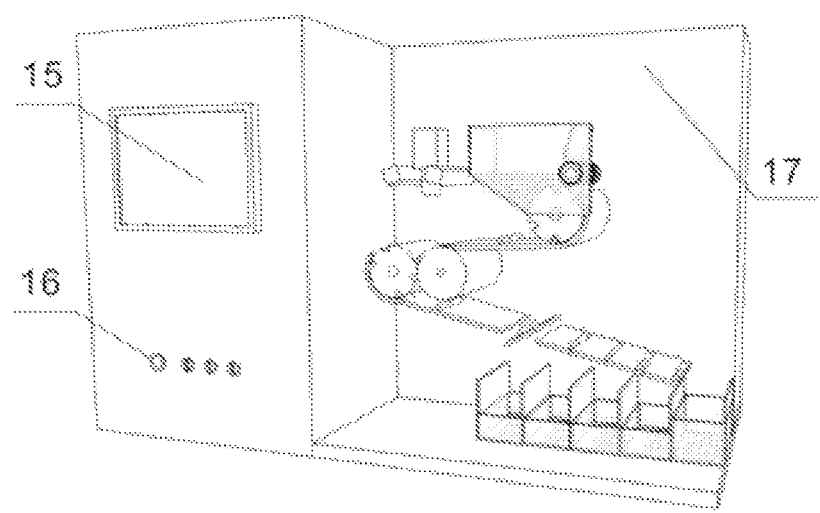
FIG. 2 is a three-dimensional view of the device for off-line detection of circumferential appearance quality of cigarettes according to the present disclosure.

As shown in FIG. 1, the device of this embodiment further includes the vision system and the control system. The vision system includes the camera 1 and a light source 2. The camera 1 and the light source 2 are arranged above the V-shaped space between the auto-rotating roller 3 and the friction roller 32. The camera is configured to photograph the 360° circumferential surface of each of the single cigarettes Y. The control system includes a controller 15. The controller 15 is configured to control the mechanical system and the vision system. As shown in FIG. 2, the mechanical system, the vision system and the control system are arranged in a mechanical support box 17. A switch 16 is provided on an outer wall of the mechanical support box.

Figure 4:
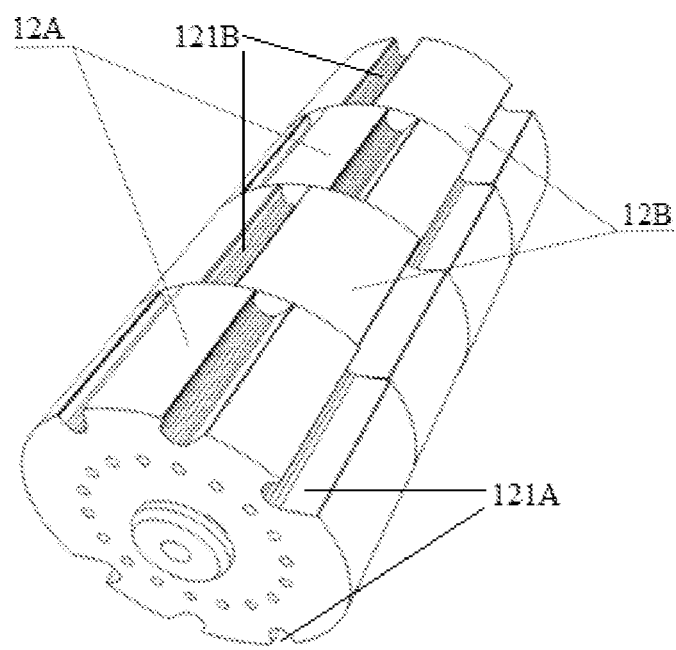
FIG. 4 is a schematic view showing appearance of the feed roller according to the present disclosure.

As shown in FIG. 4, in this embodiment, the feed roller 12 is axially divided into four sections, including two spaced-apart fixed roller 12A sections and two spaced-apart rotatable roller 12B sections. Rotatable rollers 12B rotate along a central axis of the feed roller 12. The second circular slots 121 on fixed rollers 12A are fixed circular slots 121A. The diameter of each of the fixed circular slots 121A is not less than 7.8 mm. The second circular slots 121 on the rotatable rollers 12B are multi-diameter circular slots 121B. The circular slots of each diameter have a same quantity as the fixed circular slots 121A. In this embodiment, the multi-diameter circular slots 121B involve three diameters, which are slightly larger than: 7.8 mm, 6.4 mm and 5.5 mm, respectively.

A method for off-line detection of circumferential appearance quality of cigarettes using the above-mentioned device includes the following steps: rotate the rotatable roller 12B sections based on a diameter of cigarettes Y to be detected, and match the multi-diameter circular slots 121B with the fixed circular slots 121A on a diameter basis to form the second circular slots 121 on the surface of the feed roller 12; put a certain number of cigarettes Y to be detected into the hopper 14; activate the mechanical system, the vision system and the control system by the switch 16; allow the cigarettes Y in the hopper 14 to enter into the second circular slots 121 of the clockwise-rotating feed roller 12 singly and orderly under the action of the clockwise-rotating reversing roller 13; convey the cigarettes Y into the V-shaped space between the auto-rotating roller 3 and the friction roller 32 by the upper chute 11; allow the 360° circumferential surface of each of the cigarettes Y to rotate at least once by the auto-rotating roller 3 and the friction roller 32 that rotate counterclockwise; photograph each of the cigarettes Y by the camera 1 above during rotation; allow the photographed cigarettes Y to enter into the first circular slots 31 of the auto-rotating roller 3 that rotates counterclockwise, and to be conveyed by the lower chute 4 to the multiple distribution flaps 10 at the end of the lower chute 4; meanwhile, transmit an image acquired by the camera 1 to the controller 15 for processing; control different distribution flaps 10 to turn over based on a processing result, such that different types of cigarettes fall into different cigarette receiving boxes, thereby achieving sorting of qualified and unqualified cigarettes and sorting of different types of unqualified cigarettes.

After a batch of cigarettes Y in the hopper 14 is detected, the switch 16 is pressed to turn off the mechanical system, the vision system and the control system to stop the detection.

It should be noted that the terms "left", "right", "clockwise" and "counterclockwise" herein refer to the directions in which an observer faces the device shown in FIG. 1. They are intended to facilitate description and to provide a clear and complete illustration of the present disclosure, and they also include the case where the observer looks at the device shown in FIG. 1 from other directions.

Embodiment 1

In this embodiment, the device was used to detect the appearance quality of cigarettes at a rate of 20 cigarettes per minute. The cigarette samples to be detected each had a circumference of 24.2 mm, that is, the cigarettes each had a diameter of 7.8 mm. There were five cigarettes of each defect type, which were mixed into 15 qualified cigarettes in turn to form four groups of 20 cigarette samples to be detected. The defect detection results are as follows:

Yellow-stained cigarettes: The accuracy of correct identification is 100%, and the average time to detect a single cigarette is 10.35 ms.

Punctured cigarettes: The accuracy of correct identification is 95%, and the average time to detect a single cigarette is 10.4 ms. The uneven thickness of the cigarette paper caused one cigarette to be mistakenly identified as a punctured cigarette. After manual detection, it was determined that the mistakenly identified cigarette was a normal cigarette.

Wrinkled cigarettes: The accuracy of correct identification is 100%, and the average time to detect a single cigarette is 10.7 ms.

Clipped cigarettes: The accuracy of correct identification is 100%, and the average time to detect a single cigarette is 10.65 ms.

Embodiment 2

In this embodiment, the device was used to detect the appearance quality of cigarettes at a rate of is also 20 cigarettes per minute. The cigarette samples to be detected each had a circumference of 20.0 mm, that is, the cigarettes each had a diameter of 6.4 mm. There were five cigarettes of each defect type, which were mixed into 15 qualified cigarettes in turn to form four groups of 20 cigarette samples to be detected. The defect detection results are as follows:

Yellow-stained cigarettes: The accuracy of correct identification is 100%, and the average time to detect a single cigarette is 10.35 ms.

Punctured cigarettes: The accuracy of correct identification is 100%, and the average time to detect a single cigarette is 10.4 ms.

Wrinkled cigarettes: The accuracy of correct identification is 100%, and the average time to detect a single cigarette is 10.7 ms.

Clipped cigarettes: The accuracy of correct identification is 100%, and the average time to detect a single cigarette is 10.45 ms.

Embodiment 3

In this embodiment, the device was used to detect the appearance quality of cigarettes at a rate of 20 cigarettes per minute. The cigarette samples to be detected each had a circumference of 17.0 mm, that is, the cigarettes each had a diameter of 5.5 mm. There were five cigarettes of each defect type, which were mixed into 15 qualified cigarettes in turn to form four groups of 20 cigarette samples to be detected. The defect detection results are as follows:

Yellow-stained cigarettes: The accuracy of correct identification is 100%, and the average time to detect a single cigarette is 10.25 ms.

Punctured cigarettes: The accuracy of correct identification is 100%, and the average time to detect a single cigarette is 10.3 ms.

Wrinkled cigarettes: The accuracy of correct identification is 100%, and the average time to detect a single cigarette is 10.6 ms.

Clipped cigarettes: The accuracy of correct identification is 100%, and the average time to detect a single cigarette is 10.25 ms.

It can be seen from the above embodiments that the device of the present disclosure performed off-line detection on the appearance quality of the circumferential surface of the cigarettes without omission, achieving high processing efficiency, and offering accurate and quantifiable results.

In addition, the control system of the device of the present disclosure uses cigarette defect identification software, with a core system using a deep learning (DL)-based detection algorithm. Specifically, a feature extraction algorithm based on a hue, saturation and value (HSV) color space is used to identify yellow-stained and clipped cigarettes. A Blob analysis algorithm is used to identify punctured cigarettes. A gray-level co-occurrence matrix (GLCM) feature extraction algorithm is used to identify wrinkled cigarettes. The extracted features are input into Boosting for supervised training to obtain a classifier model. In this way, the detection, classification and identification of defective cigarettes are achieved by controlling the mechanical and electrical actions of the system software, and multi-channel classification and rejection and data classification and statistical output are achieved. Through the accumulation of big data (BD) and DL training, the identification accuracy of the present disclosure will be continuously improved with the increase of the data size.

The above described are merely preferred embodiments of the present disclosure, and the protection scope of the present disclosure is not limited thereto. Any changes or replacements easily conceived by those skilled in the art within the technical scope of the present disclosure should fall within the protection scope of the present disclosure.

What is claimed is:

1. A device for an detection of circumferential appearance quality of cigarettes, comprising a mechanical system, wherein the mechanical system comprises:
   a hopper,
   a feed roller,
   an auto-rotating roller,
   an upper chute, and
   a lower chute;
   wherein a surface of the auto-rotating roller is axially evenly provided with multiple first circular slots;
   the feed roller is provided at a lower right side of the hopper; the upper chute is provided between the feed roller and the auto-rotating roller; the lower chute is provided downstream of the auto-rotating roller; multiple distribution flaps are provided at an end of the lower chute;
   the feed roller is axially divided into multiple sections comprising spaced-apart fixed roller sections and spaced-apart rotatable roller sections; each of the spaced-apart fixed roller sections comprises a fixed roller; each of the spaced-apart rotatable roller sections comprises a rotatable roller configured to rotate along a central axis of the feed roller;
   surfaces of each of the fixed rollers and each of the rotatable rollers are axially evenly provided with multiple second circular slots; and
   the multiple second circular slots on the surfaces of each of the fixed rollers are fixed circular slots with a diameter of not less than 7.8 mm; and the multiple second circular slots on the surfaces of each of the rotatable rollers are slots with a diameter of 7.8 mm, 6.4 mm, and 5.5 mm.

2. The device for the detection of circumferential appearance quality of cigarettes according to claim 1, wherein the mechanical system further comprises a reversing roller; the reversing roller is provided with a rough outer surface; the reversing roller is provided between the feed roller and the hopper and is on an upper right outer side of the feed roller; and the feed roller and the reversing roller rotate clockwise.

3. The device for the detection of circumferential appearance quality of cigarettes according to claim 1, wherein an arc length between every two adjacent first circular slots of the multiple first circular slots is not less than a circumference of a 360° circumferential surface of each of cigarettes to be detected to ensure that the 360° circumferential surface of each of the cigarettes to be detected rotates at least once; and the multiple first circular slots are matched with the multiple second circular slots in terms of diameter and quantity.

4. The device for the detection of circumferential appearance quality of cigarettes according to claim 1, wherein a friction roller is provided at a right side of the auto-rotating roller, and an upper V-shaped space is formed between the auto-rotating roller and the friction roller; the auto-rotating roller and the friction roller each are provided with a matte rough surface, and the auto-rotating roller and the friction roller rotate counterclockwise; and an end of the upper chute is provided on a surface of the friction roller.

5. The device for the detection of circumferential appearance quality of cigarettes according to claim 1, wherein cigarette receiving boxes are provided under each of the multiple distribution flaps.

6. The device for the detection of circumferential appearance quality of cigarettes according to claim 4, wherein the device further comprises a vision system and a control system; the vision system comprises a camera and a light source; the camera is provided above the upper V-shaped space between the auto-rotating roller and the friction roller; the light source is provided surrounding the camera; the control system comprises a controller for controlling the mechanical system and the vision system; the mechanical system, the vision system, and the control system are arranged in a mechanical support box; and a switch is provided on an outer wall of the mechanical support box.

7. The device for the detection of circumferential appearance quality of cigarettes according to claim 2, wherein a surface of the reversing roller is axially evenly provided with protrusions, and any two of the protrusions are spaced less than 2 mm apart.

8. A method for an detection of circumferential appearance quality of cigarettes performed by the device for the detection of circumferential appearance quality of cigarettes according to claim 1, wherein the method comprises providing the device of claim 1:
rotating the spaced-apart rotatable roller sections based on a diameter of cigarettes to be detected;
putting a certain number of cigarettes to be detected into the hopper;
activating the mechanical system, a vision system, and a control system by a switch;
allowing the cigarettes in the hopper to enter into the second circular slots of the feed roller in a clockwise-rotating state singly and orderly under an action of a reversing roller in a clockwise-rotating state;
conveying the cigarettes into an upper V-shaped space between the auto-rotating roller and a friction roller by the upper chute; allowing a 360° circumferential surface of each of the cigarettes to rotate at least once by the auto-rotating roller and the friction roller that rotate counterclockwise;
photographing each of the cigarettes rotating in the upper V-shaped space by a camera above;
allowing photographed cigarettes to enter into the first circular slots of the auto-rotating roller that rotates counterclockwise, and to be conveyed by the lower chute to the multiple distribution flaps at the end of the lower chute;
meanwhile, transmitting an image acquired by the camera to a controller of the control system for processing; and
the controller controls different distribution flaps to turn over based on a processing result, such that different types of cigarettes on the distribution flaps fall into different cigarette receiving boxes, resulting in a sorting of qualified and unqualified cigarettes and a sorting of different types of unqualified cigarettes.

9. The method for the detection of circumferential appearance quality of cigarettes according to claim 8, wherein in the device, the reversing roller has a rough outer surface, is provided between the feed roller and the hopper on an upper right outer side of the feed roller; and
the feed roller and the reversing roller rotate clockwise.

10. The method for the detection of circumferential appearance quality of cigarettes according to claim 8, wherein in the device, an arc length between every two adjacent first circular slots of the multiple first circular slots is not less than a circumference of the 360° circumferential surface of each of cigarettes to be detected to ensure that the 360° circumferential surface of each of the cigarettes to be detected rotates at least once; and the number of the multiple first circular slots and the multiple second circular slots is the same.

11. The method for the detection of circumferential appearance quality of cigarettes according to claim 8, wherein in the device, the friction roller is provided at a right side of the auto-rotating roller, and the upper V-shaped space is formed between the auto-rotating roller and the friction roller; the auto-rotating roller and the friction roller each are provided with a matte rough surface, and the auto-rotating roller and the friction roller rotate counterclockwise; and an end of the upper chute is provided on a surface of the friction roller.

12. The method for the detection of circumferential appearance quality of cigarettes according to claim 8, wherein in the device, cigarette receiving boxes are provided under each of the multiple distribution flaps.

13. The method for the detection of circumferential appearance quality of cigarettes according to claim 11, wherein the vision system comprises the camera and a light source; the camera is provided above the upper V-shaped space between the auto-rotating roller and the friction roller; the light source is provided surrounding the camera; the control system comprises the controller for controlling the mechanical system and the vision system; the mechanical system, the vision system, and the control system are arranged in a mechanical support box; and the switch is provided on an outer wall of the mechanical support box.

14. The method for the detection of circumferential appearance quality of cigarettes according to claim 9, wherein in the device, a surface of the reversing roller is axially evenly provided with protrusions, and any two of the protrusions are spaced less than 2 mm apart.

* * * * *